Figure 1:
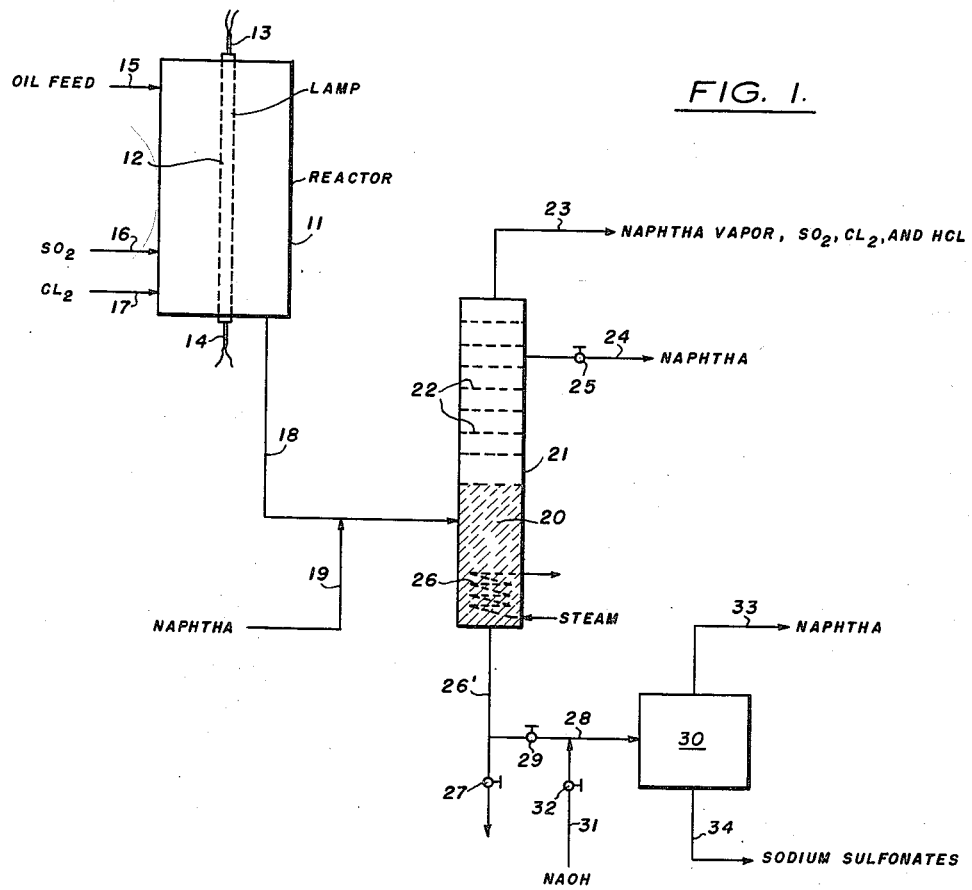

Jan. 5, 1954

H. E. CIER 2,665,305

TREATMENT OF SULFONYL CHLORIDES

Filed Nov. 20, 1952

INVENTOR.
Harry E. Cier,
BY
AGENT.

Patented Jan. 5, 1954

2,665,305

UNITED STATES PATENT OFFICE 2,665,305

TREATMENT OF SULFONYL CHLORIDES

Harry E. Cier, Baytown, Tex., assignor, by mesne assignments, to Standard Oil Development Company, Elizabeth, N. J., a corporation of Delaware Application November 20, 1952, Serial No. 321,663

12 Claims. (Cl. 260—504)

The present invention is directed to the treatment of sulfonyl chlorides. More particularly, the invention is directed to a method for degassing sulfonyl chlorides containing dissolved gases. In its more specific aspects, the invention is directed to a process for degassing a sulfonyl chloride product under conditions to prevent degradation thereof.

The present invention may be described briefly as a method for degassing a hydrocarbon sulfonyl chloride product containing dissolved sulfur dioxide, chlorine, and hydrogen chloride in which the product containing said dissolved gases is introduced into a pool of a light hydrocarbon boiling in the range between 95° and 210° F. while maintaining conditions in said pool to vaporize at least partially the light hydrocarbon and to degas the product at a temperature not in excess of the boiling point of the light hydrocarbon.

The sulfonyl chloride product which is treated in accordance with the present invention is a hydrocarbon sulfonyl product which is produced by reacting the hydrocarbon, such as a lubricating oil fraction, with sulfur dioxide and chlorine in the presence of light.

These hydrocarbon sulfonyl chlorides are readily produced from petroleum fractions by reacting hydrocarbons photochemically with sulfur dioxide and chlorine. In forming hydrocarbon sulfonyl chlorides in this manner the hydrocarbon is irradiated with light in the presence of sulfur dioxide and chlorine. The products formed are principally the hydrocarbon sulfonyl chloride and hydrogen chloride. However, by-products are also formed during the course of the reaction which comprise organic chlorides, such as tertiary, secondary, etc. and poly-substituted derivatives of the hydrocarbon being treated, such as di-sulfonyl chlorides.

After the reaction has been completed, it is necessary to degas the product in order to remove the sulfur dioxide, chlorine and hydrogen chloride therefrom. In accordance with the prior art teachings this degassing operation has been accomplished by blowing the product with an inert gas, such as nitrogen or by subjecting the product to low pressures. However, if a high molecular weight hydrocarbon is used as a feed stock or if the rate of conversion achieved in the sulfo-chlorination is high, the viscosity of the product is so great that it is necessary to heat the product in order to degas it. It has been observed during this degassing operation considerable degradation of color of the product has resulted. It is postulated that the color degradation may be due to formation of dark colored material from thermally unstable materials in the product or to formation of thermally unstable materials in the product which decompose to give highly colored dark materials. This color degradation appears to be accelerated when the reaction product is in contact with air under slightly elevated temperatures.

In accordance with the present invention it has been found that this color degradation can be substantially eliminated by introducing the product containing the dissolved gases mentioned before into a pool of a light hydrocarbon.

The light hydrocarbon employed in the practice of the present invention may be a petroleum fraction such as the so-called petroleum ether boiling in the range of from approximately 95° to 125° F. However, the light hydrocarbon may have a somewhat wider boiling range and suitably may boil from about 95° to about 210° F. If the sulfonyl chloride product is degassed immediately after the reaction has been completed, it may be desirable to adjust the temperature of the mixture of the sulfonyl chloride and the light hydrocarbon into which it is introduced. For example, the temperature of the mixture may be raised or lowered. If the sulfo-chlorination reaction is conducted at a temperature substantially above the boiling range of the light hydrocarbon it will be necessary to lower the temperature of the mixture of the light hydrocarbon and product. Yet, on the other hand, if the sulfo-chlorination reaction takes place at a lower temperature than the final boiling point of the light hydrocarbon, it may be necessary to heat the mixture to cause at least partial vaporization of the light hydrocarbon and degassing of the product. In no event should the mixture be heated above the final boiling point of the light hydrocarbon.

The presence of the light hydrocarbon during the degassing operation serves to maintain the temperature of the mixture to prevent color degradation which is ordinarily suffered by exposure to the higher temperatures and also serves to exclude air from contact with the product. Not only does the degassing operation in accordance with the present invention obtain this beneficial result but it also allows the neutralization of the sulfonyl chlorides in the hydrocarbon solution without exposing the product being neutralized to elevated temperatures. For example, the sulfonyl chlorides are usually neutralized with an alkali metal hydroxide to form an alkali metal sulfonate. For example, the product may be neutralized with sodium hydroxide to form sodium sulfonate. In accordance with my invention the neutralization may be conducted with the degassed product in solution in the light hydrocarbon. Thus the degassed product has an alkali metal hydroxide, such as sodium hydroxide, introduced into it and the degassed product and alkali metal hydroxide may then be introduced into a suitable chamber. The neutralization reaction is exothermic and considerable heat is liberated during this reaction. By virtue of the presence of the light hydrocarbons from the degassing operation in the solution of the product undergoing neutralization, the temperature of the mixture is maintained by removing the heat of neutralization by evaporation or vaporization of the light hydrocarbon. Thus the temperature during the neutralization reaction is substantially maintained by auto-refrigeration thereof.

Figure 2:
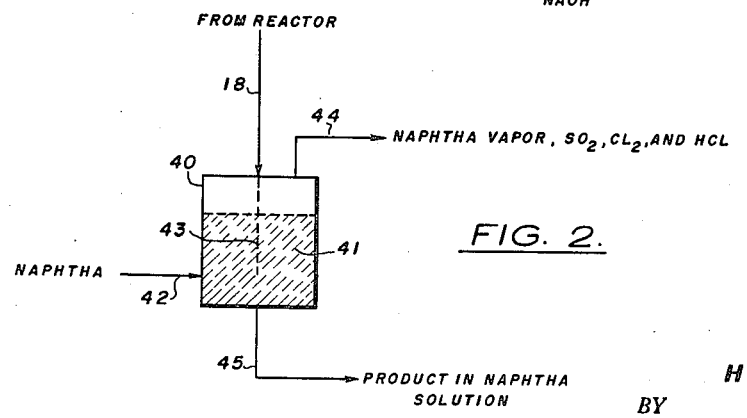

The present invention will be further illustrated by reference to the drawing in which Fig. 1 is a flow diagram of a preferred mode and Fig. 2 is a modification of the mode of Fig. 1.

Referring now to the drawing in which identical numerals will be employed to designate identical parts, numeral 11 designates a photochemical reactor provided with an elongated lamp 12 such as a mercury lamp, running the length of the reactor 11, which is provided with suitable electrical conducting leads 13 and 14. The reactor 11 is provided with a line 15 through which an oil feed to the reactor is introduced, and with lines 16 and 17 through which sulfur dioxide and chlorine gases are introduced, respectively.

The oil fed into line 15 is sulfo-chlorinated in the presence of light radiations on passage through the reactor 11 and the product of the sulfo-chlorination reaction including unreacted feed, dissolved sulfur dioxide, chlorine and reaction products, such as hydrogen chloride, organic chlorides and poly-substituted derivatives of the hydrocarbon feed, is withdrawn from the reactor 11 by line 18. In accordance with the embodiment of Fig. 1, the product containing the dissolved gases has admixed with it a light hydrocarbon, such as a naphtha introduced into lines 18 and 19. The light hydrocarbons, such as naphtha, and the reaction product are admixed in line 18 and are discharged thereby into a pool 20 of light hydrocarbon in admixture with the reaction product.

The amount of light hydrocarbon introduced into line 18 by line 19 will vary with the viscosity of the product in line 18. Ordinarily the amount of the light hydrocarbon will range from 0.2 to 2.0 volumes of light hydrocarbon per volume of the reactor product.

The pool 20 of light hydrocarbon is maintained in a suitable flash tower 21 which may have provided in an upper section thereof suitable contact means such as bell cap trays, indicated generally by numeral 22. This contact means may be other vapor-liquid distributing means well known to the art such as Raschig rings, Berl saddles, glass beads and many other contacting means well known to the art. The upper section of flash tower 21 actually comprises a distillation tower and is provided with all auxiliary means thereto and with lines 23 and 24, the latter being controlled by valve 25.

The lower section of flash tower 21 has arranged therein a heating means illustrated by a steam coil 26 which serves for the introduction of heat into the pool 20. The pool 20 is maintained at the boiling point of the light hydrocarbon to allow distillation and removal by line 23 of the naphtha vapor and the dissolved sulfur dioxide, chlorine and hydrogen chloride present in the reactor product in line 18. It may be desirable to conduct the operation in tower 21 such that all or substantially all of the naphtha is distilled from the product. In such case, it may be desirable to allow naphtha vapor to be withdrawn also by line 24.

As a preferred mode of operation, however, only part of the naphtha is removed by vaporization through line 23 along with the dissolved gases from the reaction product and the remainder is discharged from flash tower 21 with the product from reactor 11 in solution. This solution is discharged from tower 21 by line 26' and may be withdrawn from the system by opening valve 27. Preferably, however, the solution is routed by line 28 controlled by valve 29 into a neutralization drum 30. On passage through line 28 the sulfonyl chloride product in solution has added to it by way of line 31 controlled by valve 32 a sufficient amount of an alkali metal hydroxide or other neutralizing agent which may be added as an aqueous solution. For example, a solution of sodium hydroxide having a 30° Bé. gravity may suitably be employed. As a result of the addition of the solution of alkali metal hydroxide, the sulfonyl chlorides are neutralized in drum 30 which results in the liberation of heat by the exothermic neutralization reaction. This liberation of heat causes partial vaporization of the light hydrocarbon from the solution and these vapors are removed by line 33. Vaporization of the light hydrocarbon results in maintenance of the temperature of the solution in line 28 since vaporization of the light hydrocarbon or naphtha causes auto-refrigeration of the solution undergoing neutralization. As a result of the neutralizing operation in drum 30, alkali metal sulfonates are formed in the solution. This solution containing the alkali metal sulfonates may be withdrawn from the system by line 34 for further processing to remove unreacted oil feed, light hydrocarbon and to recover the alkali metal sulfonate.

As a modified mode of the present invention the reactor product from reactor 11 in line 18 may be introduced into a flash drum 40 containing a pool 41 of light naphtha which is maintained by introduction of naphtha through line 42 at a lower point in drum 40. Line 18 extends into the pool 41 by means of an extension pipe 43 below the surface of the pool 41. Thus the naphtha or light hydrocarbon may be introduced by line 42 in a heated or chilled condition as required to adjust the temperature of pool 41 and to allow partial vaporization of the naphtha and degassing of the reactor product to remove the dissolved sulfur dioxide, chlorine and hydrogen chloride. This provision is made to remove naphtha vapor and the dissolved gases from drum 40 by line 44.

The product from drum 40 may be discharged therefrom by line 45 for withdrawal from the system or, like in the mode of Fig. 1, line 45 may connect into line 28 for neutralization of the product in solution.

The sulfo-chlorination reaction conducted in reactor 11 may be conducted at a temperature in the range from 75° F. to 225° F. Good results may be obtained with lubricating oil at a temperature of about 150° F.

The invention will be described further by reference to the following example:

A lubricating oil of approximately 450 molecular weight, having a viscosity at 210° F. of about 58 seconds was irradiated with a mercury vapor lamp while sulfur dioxide and chlorine were being bubbled through the oil. After one hour's operation an analysis of the reactor product showed that the hydrocarbon sulfonyl chloride was present in the reactor product in concentrations of 10 to 11 per cent. At this point the run was terminated and the reactor product was divided into two portions. Portion A was placed in a flask and evacuated while being heated to temperatures of approximately 200° to 225° F. Considerable darkening occurred before complete degassing was accomplished. Portion B of the reactor product was added to an approximately equal volume of petroleum ether, with a boiling range of approximately 95° to 125° F. to form a solution. Since the reaction had been conducted at approximately 150° F. a considerable amount of the light diluent was distilled off before the temperature was reduced below the boiling point of the solution. By this technique three beneficial effects were achieved: The viscosity of the oil was greatly reduced by solution in the light hydrocarbon solvent; the rapid distillation of the petroleum either aided in a rapid degassing of the reactor product; the introduction of the oil below the surface of the petroleum ether minimized contact with air and the distillation of the ether coupled with the removal of the unreacted gases tended to prevent any contamination from air. As a result, the degassed oil from portion B was markedly better in color than would have been achieved in a normal degassing procedure. The color of the original oil was determined and found to be 11½ Tag Robinson color. The color of the material in portion A was about 1 Tag Robinson while the color from portion B was about 9 Tag Robinson color.

From the foregoing runs it will be apparent that the degassing operation in accordance with the present invention results in a product of substantially improved color. It will be seen from the foregoing operations that very desirable results are obtained by rapid dilution of the raw reactor product with a low boiling light hydrocarbon under conditions that a portion of the light hydrocarbon is rapidly vaporized.

The nature and objects of the present invention having been completely described and illustrated, what I wish to claim as new and useful and to secure by Letters Patent is:

1. A method for preventing degradation of a hydrocarbon sulfonyl chloride product containing dissolved sulfur dioxide, chlorine, and hydrogen chloride and which is susceptible to color degradation which comprises introducing said product into a pool of a light hydrocarbon boiling in the range between 95° and 210° F. and forming a mixture therewith, adjusting the temperature of the mixture to a temperature not in excess of the boiling point of the light hydrocarbon and vaporizing at least partially said light hydrocarbon and the dissolved sulfur dioxide, chlorine, and hydrogen chloride from said mixture.

2. A method for preventing degradation of a hydrocarbon sulfonyl chloride product containing dissolved sulfur dioxide, chlorine and hydrogen chloride and which is susceptible to color degradation which comprises introducing said product at a temperature of approximately 150° F. into a pool of a light hydrocarbon boiling in the range between 95° and 125° F. and forming a mixture therewith, adjusting the temperature of the mixture to a temperature not in excess of 125° F. and vaporizing at least partially said light hydrocarbon and the dissolved sulfur dioxide, chlorine, and hydrogen chloride from said mixture.

3. A method for degassing a hydrocarbon sulfonyl chloride product containing dissolved sulfur dioxide, chlorine, and hydrogen chloride which comprises introducing said product into a pool of a light hydrocarbon boiling in the range between 95° and 210° F. while maintaining conditions in said pool to vaporize at least partially said light hydrocarbon and to degas said product at a temperature within the boiling range of said light hydrocarbon.

4. A method in accordance with claim 3 in which the light hydrocarbon boils in the range between approximately 95° and 125° F. and the product is introduced into the pool at a temperature of approximately 150° F.

5. A method for degassing a hydrocarbon sulfonyl chloride product containing dissolved sulfur dioxide, chlorine, and hydrogen chloride which comprises forming a mixture of said product and a light hydrocarbon boiling in the range between 95° and 210° F. and introducing said mixture into a pool of said light hydrocarbon maintained at a temperature within the boiling range of said light hydrocarbon sufficient to vaporize at least partially said light hydrocarbon and to degas said product.

6. A method in accordance with claim 5 in which the product is a viscous hydrocarbon sulfonyl chloride product formed by reacting a hydrocarbon in the lubricating oil boiling range with sulfur dioxide and chlorine in the presence of light.

7. A method for degassing a hydrocarbon sulfonyl chloride product containing dissolved sulfur dioxide, chlorine, and hydrogen chloride which comprises forming a mixture of said product and a light hydrocarbon boiling in the range between 95° and 210° F. and introducing said mixture into a pool of said mixture maintained at a temperature within the boiling range of said light hydrocarbon sufficient to vaporize at least partially said light hydrocarbon and to degas said product.

8. A method in accordance with claim 7 in which the product is a viscous hydrocarbon sulfonyl chloride product formed by reacting a hydrocarbon in the lubricating oil boiling range with sulfur dioxide and chlorine in the presence of light.

9. A method for treating a viscous hydrocarbon sulfonyl chloride product containing dissolved sulfur dioxide, chlorine, and hydrogen chloride which comprises forming a mixture of said product and a light hydrocarbon boiling in the range between 95° and 210° F., introducing said mixture into a pool of said light hydrocarbon maintained at a temperature within the boiling range of said light hydrocarbon sufficient to vaporize partially said light hydrocarbon and to degas said product, withdrawing said degassed product from said pool in solution in said light hydrocarbon, and neutralizing said degassed product in solution while vaporizing at least a portion of the light hydrocarbon from the solution to maintain the temperature of said solution substantially constant during said neutralization.

10. A method in accordance with claim 9 in which the degassed product is neutralized by adding an alkali metal hydroxide to the solution.

11. A method for treating a viscous hydrocarbon sulfonyl chloride product containing dissolved sulfur dioxide, chlorine, and hydrogen chloride which comprises forming a mixture of said product and a light hydrocarbon boiling in the range between 95° and 210° F., introducing said mixture into a pool of said mixture maintained at a temperature within the boiling range of said light hydrocarbon sufficient to vaporize partially said light hydrocarbon and to degas said product, withdrawing said degassed product from said pool in solution in said light hydrocarbon, and neutralizing said degassed product in solution while vaporizing at least a portion of the light hydrocarbon from the solution to maintain the temperature of said solution substantially constant during said neutralization.

12. A method in accordance with claim 11 in which the degassed product is neutralized by adding an alkali metal hydroxide to the solution.

HARRY E. CIER.

No references cited.